(12) United States Patent
Wakazono et al.

(10) Patent No.: US 10,751,959 B2
(45) Date of Patent: Aug. 25, 2020

(54) DEVICE AND METHOD FOR MANUFACTURING FIBER-REINFORCED THERMOPLASTIC RESIN TAPE

(71) Applicant: Kobe Steel, Ltd., Kobe-shi (JP)

(72) Inventors: Takehiko Wakazono, Takasago (JP); Naoyuki Tashiro, Takasago (JP); Yasuhiro Sakurai, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 109 days.

(21) Appl. No.: 15/751,292

(22) PCT Filed: Aug. 3, 2016

(86) PCT No.: PCT/JP2016/072726
§ 371 (c)(1),
(2) Date: Feb. 8, 2018

(87) PCT Pub. No.: WO2017/029986
PCT Pub. Date: Feb. 23, 2017

(65) Prior Publication Data
US 2018/0243999 A1 Aug. 30, 2018

(30) Foreign Application Priority Data
Aug. 17, 2015 (JP) .................................. 2015-160297

(51) Int. Cl.
*B29C 70/52* (2006.01)
*B29B 15/12* (2006.01)
(Continued)

(52) U.S. Cl.
CPC .......... *B29C 70/528* (2013.01); *B29B 15/122* (2013.01); *B29C 70/10* (2013.01);
(Continued)

(58) Field of Classification Search
CPC ..... B29C 70/52; B29C 70/525; B29C 70/526; B29C 70/527; B29C 70/528; B29C 70/10;
(Continued)

(56) References Cited

U.S. PATENT DOCUMENTS 5,111,595 A 5/1992 Bessinger et al.
5,967,512 A * 10/1999 Irsik ....................... B65H 5/062
226/177
(Continued)

FOREIGN PATENT DOCUMENTS

JP 2-35080 B2 8/1990
JP 4-216053 A 8/1992
(Continued)

OTHER PUBLICATIONS

The English translation of the International Preliminary Report on Patentability and Written Opinion dated Mar. 1, 2018 in PCT/JP2016/072726.
(Continued)

*Primary Examiner* — Michael N Orlando
*Assistant Examiner* — Christopher W Raimund
(74) *Attorney, Agent, or Firm* — Oblon, McClelland, Maier & Neustadt, L.L.P.

(57) ABSTRACT

Provided are a device and a method capable of suitable cooling of a fiber bundle without hindering nozzle maintenance work or preparation work before the start of manufacturing. The provided device includes a nozzle which allows the fiber bundle impregnated with thermoplastic resin to pass therethrough while forming the fiber bundle into a tape shape, a cooling roller for cooling the fiber bundle, and a supporting device. The supporting device supports the cooling roller rotatably so as to allow the cooling roller to be moved between a cooling position at which an outer periphery surface of the cooling roller makes contact with the fiber
(Continued)

bundle having passed through the nozzle and a retraction position away from the nozzle beyond the cooling portion.

9 Claims, 11 Drawing Sheets

(51) Int. Cl.
  *B29C 70/10* (2006.01)
  *B29C 70/56* (2006.01)
  *B29K 23/00* (2006.01)
  *B29K 307/04* (2006.01)

(52) U.S. Cl.
  CPC ............ *B29C 70/526* (2013.01); *B29C 70/56* (2013.01); *B29K 2023/12* (2013.01); *B29K 2307/04* (2013.01)

(58) Field of Classification Search
  CPC ....... B29C 70/56; B29C 70/54; B29B 15/122; B29K 2307/04; B29K 2023/12; B29L 2007/007
  See application file for complete search history.

(56) References Cited

U.S. PATENT DOCUMENTS

| | | | |
|---|---|---|---|
| 2004/0091622 A1* | 5/2004 | Fernandes | ............ B29B 15/122 427/355 |
| 2012/0251823 A1* | 10/2012 | Maldonado | ........... B29B 15/122 428/367 |

FOREIGN PATENT DOCUMENTS

| | | | |
|---|---|---|---|
| JP | 10-100179 A | | 4/1998 |
| JP | 10-249949 A | | 9/1998 |
| JP | 2007-118216 A | | 5/2007 |
| JP | 2007118216 A | * | 5/2007 |
| JP | 2008-110491 A | | 5/2008 |
| JP | 2009-137177 A | | 6/2009 |
| JP | 2013-203000 A | | 10/2013 |

OTHER PUBLICATIONS

International Search Report dated Sep. 13, 2016, In PCT/JP2016/072726 filed Aug. 3, 2016.
Extended European Search Report dated Mar. 14, 2019 in European Patent Application No. 16836977.5, 6 pages.

* cited by examiner

DEVICE AND METHOD FOR MANUFACTURING FIBER-REINFORCED THERMOPLASTIC RESIN TAPE

TECHNICAL FIELD

The present invention relates to a device and a method for manufacturing a fiber-reinforced thermoplastic resin tape having continuous fiber and thermoplastic resin impregnated in the fiber.

BACKGROUND ART

Patent Literature 1 discloses a carbon fiber-reinforced thermoplastic resin tape and a manufacturing method therefor. The manufacturing method includes extracting carbon fiber impregnated with melted resin through a downstream side slit nozzle, and quickly cooling a tape immediately after being drawn out from the downstream side slit nozzle by a tape cooling means provided downstream of the downstream side slit nozzle at a predetermined temperature dropping rate or higher.

Patent Literature 1 recites that it is desirable to locate a cooling roller as the tape cooling means as close to the downstream side slit nozzle as possible in order to prevent deformation of the tape. Patent Literature 1 discloses an Example with an axis-to-axis distance of 200 mm between a nozzle roller of the downstream side slit nozzle and the cooling roller downstream thereof.

The inventers conducted a test, having found that a large distance between a tip end of the nozzle and an axis of the cooling roller causes roughness and fineness of fiber widthwise of manufactured fiber-reinforced thermoplastic resin tape and, in an extreme case, causes a part in which only thermoplastic resin exists without fiber or a defective part in which neither fiber nor thermoplastic resin exists.

However, locating the cooling roller close to the nozzle for suppressing generation of the defective part causes the cooling roller to obstruct work of removing the nozzle from the device at the time of maintenance of the nozzle, thereby hindering the maintenance. The cooling roller also obstructs work of laying a fiber bundle of carbon fibers, which have not been yet impregnated with melted resin, on the device, thereby hindering preparation work before the start of manufacturing.

CITATION LIST

Patent Literature

Patent Literature 1: Japanese Patent Unexamined Publication No. 2007-118216

SUMMARY OF INVENTION

An object of the present invention is to provide a device and a method for manufacturing a fiber-reinforced thermoplastic resin tape, the device and the method being capable of suitably cooling a fiber bundle without hindering maintenance work and preparation work before the start of manufacturing.

Provided is a device for manufacturing a fiber-reinforced thermoplastic resin tape, the device including: a resin impregnation device which has a container that contains melted thermoplastic resin and passes a fiber bundle through the thermoplastic resin contained in the container to impregnate the fiber bundle with the thermoplastic resin; a nozzle which is provided in an outlet portion of the container of the resin impregnation device and allows the fiber bundle impregnated with thermoplastic resin to pass through the nozzle, while forming the fiber bundle into a tape shape; a cooling roller which has an outer periphery surface capable of making contact with the fiber bundle having passed through the nozzle, the cooling roller being capable of rotating around a roller center axis so as to allow the fiber bundle to be moved downstream while the outer periphery surface makes contact with the fiber bundle, the cooling roller adapted to cool the fiber bundle through the contact of the outer periphery surface with the fiber bundle; and a supporting device which rotatably supports the cooling roller so as to allow the cooling roller to move between a cooling position at which the outer periphery surface of the cooling roller is capable of contact with the fiber bundle having passed through the nozzle and a retraction position away from the nozzle beyond the cooling position.

Also provided is a method for manufacturing a fiber-reinforced thermoplastic resin tape, the method including: a resin impregnation step of impregnating a fiber bundle with melted thermoplastic resin; a nozzle passing step of passing the fiber bundle, which has been impregnated in the resin impregnation step, through an opening of a nozzle; a cooling step of cooling the fiber bundle while sending the fiber bundle downstream by bringing the fiber bundle having passed through the nozzle passing step into contact with an outer periphery surface of a cooling roller disposed at a cooling position downstream of the nozzle while involving rotation of the cooling roller around a roller center axis of the cooling roller; and a moving step of moving the cooling roller from the cooling position to a retraction position away from the nozzle beyond the cooling position when no manufacture of the fiber-reinforced thermoplastic resin tape is performed through the resin impregnation step, the nozzle passing step, and the cooling step.

DESCRIPTION OF EMBODIMENT

There will be described below a preferred embodiment of the present invention with reference to the drawings.

Figure 1:
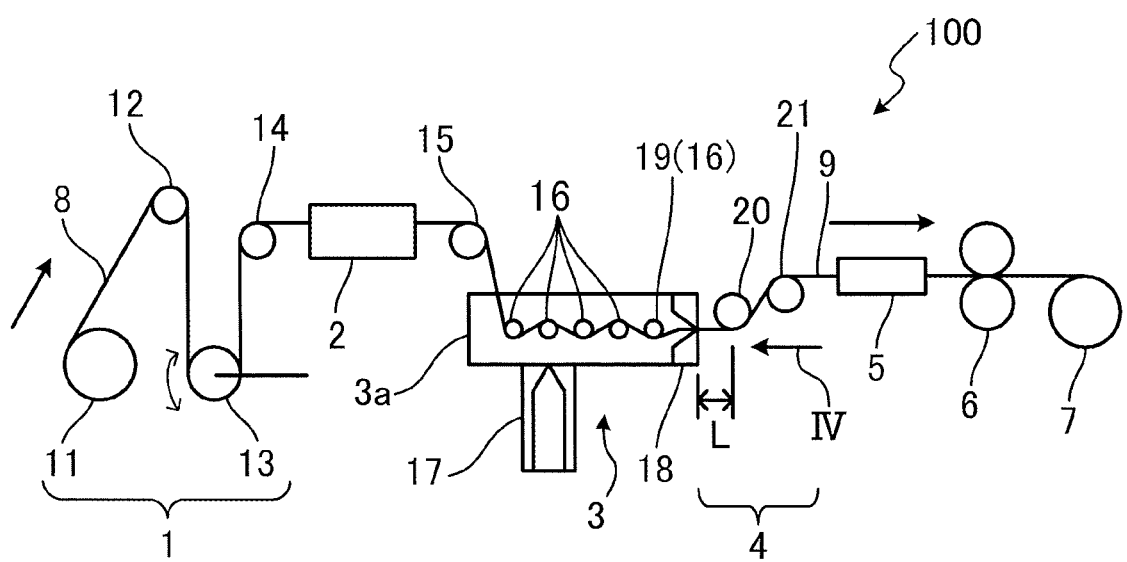
FIG. 1 is a side view of a fiber-reinforced thermoplastic resin tape manufacturing device according to an embodiment of the present invention.

FIG. 1 shows an entire fiber-reinforced thermoplastic resin tape manufacturing device 100 according to an embodiment of the present invention. The manufacturing device 100 performs manufacture of the fiber-reinforced thermoplastic resin tape with transferring a fiber bundle 8 along a specific transfer direction. The manufacturing device 100 includes a feeder 1, a fiber preheater 2, a resin impregnation device 3, a nozzle 18, a cooling roller portion 4, a cooling portion 5, a drawing machine 6, and a winding machine 7, these components being aligned in order along the transfer direction. In addition, the manufacturing device 100 further includes a supporting device 51 shown in FIG. 10 and FIG. 11.

The feeder 1 includes a fiber bobbin 11, a guide bar 12, a dancing roller 13, and a guide roller 14. Around the fiber bobbin 11, the fiber bundle 8 is wound. The fiber bundle 8 is formed of a plurality (e.g. 12000) of fibers bound to each other. The fibers configuring the fiber bundle 8 according to the present embodiment are carbon fibers. The fibers configuring the fiber bundle according to the present invention are, however, not limited to carbon fibers but also permitted to be continuous fibers such as glass fibers, aramid fibers, ceramics fibers, metal fibers, fibers obtained from heterocycle-containing polymer formed of polybenzothiazole, polybenzoxazole or to be natural plant fibers configured as yarn obtained by spinning noncontinuous fibers. As the carbon fiber, carbon fibers can be used such as those based on polyacrylonitrile (PAN), petroleum and coal-pitch, rayon, lignin.

The guide bar 12, though having a circular cross-section, is disposed so as to be prevented from rotating around an axis thereof. In contrast, the dancing roller 13 and the guide roller 14, each having a circular cross-section, are disposed so as to rotate around axes thereof. Furthermore, the dancing roller 13 is vertically movable. It is also possible to appropriately adopt, in place of the guide bar 12, one which rotates around an axis thereof, or adopt, in place of the dancing roller 13, one which is prevented from rotating around an axis thereof, according to conditions such as a travelling speed of the fiber bundle 8, etc.

The fiber bundle 8 is fed from the fiber bobbin 11 and is transferred in contact with the guide bar 12, the dancing roller 13, and the guide roller 14. This involves a fixed tension applied to the fiber bundle 8.

Figure 2:
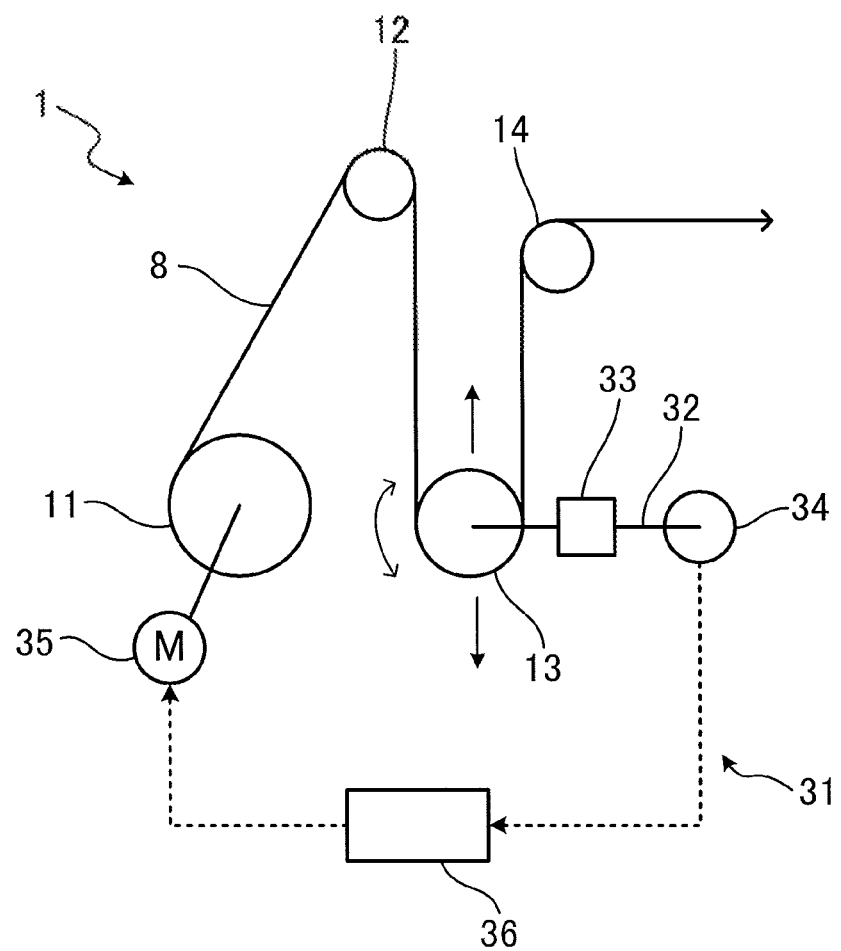
FIG. 2 is a side view showing a feeder in expansion, the feeder being included in the manufacturing device.

The feeder 1 has a tension adjustment mechanism 31 shown in FIG. 2, the tension adjustment mechanism 31 adapted to adjust tension acting on the fiber bundle 8 to keep the tension constant. The tension adjustment mechanism 31 includes a bar member 32 connected to a center shaft of the dancing roller 13, a tension applying weight 33 attached to the bar member 32, an angle detector 34 connected to the bar member 32, a motor 35, and a controller 36. The bar member 32 has a proximal end portion rotatably supported by the angle detector 34 and a distal end portion opposite to the proximal end portion, the distal end portion supporting the dancing roller 13 rotatably.

The tension applying weight 33 applies a downward force of constant magnitude to the dancing roller 13. The angle detector 34 detects a rotation angle of the bar member 32.

The motor 35 rotates the fiber bobbin 11. The motor 35 and the angle detector 34 are electrically connected to the controller 36. The controller 36 adjusts a rotational speed of the motor 35 according to an angle detected by the angle detector 34, thereby controlling a tension of the fiber bundle 8 fed from the fiber bobbin 11 to be constant. This control enables stable opening of the fiber bundle 8 to be performed in the resin impregnation device 3 as will be described later.

In the present embodiment, a preferred tension of the fiber bundle 8 is, for example, 300 g. A preferred travelling speed of the fiber bundle 8 is, for example, 3 m/min.

Means for making the tension of the fiber bundle 8 fed from the fiber bobbin 11 be constant is not limited to the tension adjustment mechanism 31. Control for making the tension of the fiber bundle 8 be constant can be also established by, for example, calculating a diameter of the fiber bundle 8 rolled around the fiber bobbin 11 on the basis of the travelling speed of the fiber bundle 8 and the number of times of rotation of the fiber bobbin 11 and adjusting a brake torque of the fiber bobbin 11 by powder clutch or the like. Besides, to manufacture a wide tape, it is also possible to feed the fibers from a plurality of the fiber bobbins 11. For example, a plurality of feeders may be arranged in parallel to each other, each feeder being configured equivalently to the feeder 1.

The fiber preheater 2 shown in FIG. 1 is configured to heat the fiber bundle 8 fed from the feeder 1 to about 100° C. The heating softens a sizing agent adhered on the fiber bundle 8 to facilitate opening of the fiber bundle 8 and impregnation of the fiber bundle 8 with thermoplastic resin in the subsequent step. The fiber preheater 2 preferably includes, for example, a pipe which allows the fiber bundle 8 to pass therethrough and a heater formed of a heating wire wound around the pipe. The sizing agent serves for convergence of the plurality of fibers forming the fiber bundle 8 with each other to facilitate the handling thereof.

The fiber bundle 8 carried out from the fiber preheater 2 is transferred to the resin impregnation device 3 via a guide roller 15. The guide roller 15, which has a circular cross-section, is disposed rotatably around an axis thereof. In place of the guide roller 15, a guide bar may be used, having a circular cross-section and prevented from rotating around an axis thereof. Selection between the guide roller 15 and the guide bar is appropriately conducted according to conditions such as the travelling speed of the fiber bundle 8, etc.

The resin impregnation device 3 is configured to perform opening of the fiber bundle 8 and impregnation of the fiber bundle 8 with melted thermoplastic resin. The resin impregnation device 3 includes a container 3a, a plurality of impregnation rollers 16, and an extruder 17.

The container 3a has a cylindrical shape long in the transfer direction of the fiber bundle 8. The container 3a stores melted thermoplastic resin. Temperature of the melted thermoplastic resin is, for example, 230° C.

The extruder 17 is connected to the container 3a to supply the melted thermoplastic resin into the container 3a. In the present embodiment, the melt flow rate (MFR) of thermoplastic resin, namely, an index indicative of fluidity of synthetic resin, is set to an arbitrary value within a range of 30 to 115 [g/10 minutes]. The present invention allows also thermoplastic resin having other MFR than those within the above range to be used.

The thermoplastic resin according to the present embodiment is polypropylene. However, the thermoplastic resin used in the present invention is not limited thereto but also permitted to be acrylonitrile-butadiene-styrene copolymer (ABS), polyamide (nylon 6, nylon 66, etc.), polyacetal, polycarbonate, high density polyethylene, low density polyethylene, straight chain low density polyethylene, polyethylene terephthalate, polybutylene terephthalate, polyether imide, polystyrene, polyether sulfone, polyphenylene sulfide, polyetherketone, polyether ether ketone, and the like.

The plurality of impregnation rollers 16 are arranged at predetermined intervals in the container 3a along the transfer direction of the fiber bundle 8. The intervals between the plurality of impregnation rollers 16 may be either constant or different from each other. Each impregnation roller 16, which has a circular cross-section and is supported in the container 3a rotatably around an axis thereof, rotates in contact with the fiber bundle 8 transferred in the transfer direction, in a direction to allow the transfer. In place of each impregnation roller 16, a guide bar may be provided, having a circular cross-section and not rotating around an axis thereof.

The fiber bundle 8 passes through the container 3a storing thermoplastic resin melted as described above in a zigzag manner while making contact with each of the plurality of impregnation rollers 16 in the container 3a. Specifically, the fiber bundle 8 passes through the container 3a in the transfer direction while making contact with an outer periphery surface of a lower portion of one impregnation roller 16 and contact with an outer periphery surface of an upper portion of a subsequent impregnation roller 16, alternately. Thus passing fiber bundle 8 is opened by each impregnation roller 16 and the fiber bundle 8 is impregnated with melted thermoplastic resin.

The number of the plurality of impregnation rollers 16 is determined according to the state of opening of the fiber bundle 8, and the state of impregnation of the fiber bundle 8 with thermoplastic resin. The excessively large number of the impregnation rollers 16 causes the fiber bundle 8 to be excessively opened to increase respective fiber densities at widthwise ends of the fiber bundle 8. Furthermore, the excessively large number of the impregnation rollers 16 causes the tension in the fiber bundle 8 to be excessively high to promote fiber cut. Conversely, the excessively small number of the impregnation rollers 16 hinders the fiber bundle 8 from being sufficiently opened, thereby causing partially high fiber density at the widthwise center of the fiber bundle 8 or hindering the fiber bundle 8 from being sufficiently impregnated with thermoplastic resin.

The nozzle 18 is provided in an outlet portion of the container 3a. The nozzle 18 serves to shape the fiber bundle 8 while allowing the fiber bundle 8 discharged from the container 3a to pass through the nozzle 18. The nozzle 18 has an opening for allowing passage of the fiber bundle 8. The opening is, for example, a rectangular slit, having a shape to form the fiber bundle 8 passing through the opening into a tape shape. In summary, the nozzle 18 allows the fiber bundle 8 impregnated with thermoplastic resin to pass through the nozzle 18 while forming the fiber bundle 8 into a tape shape. Hereinafter, the fiber bundle 8 having passed through the nozzle 18 will be called tape 9. Temperature of the nozzle 18 is, for example, 230° C.

Figure 3:
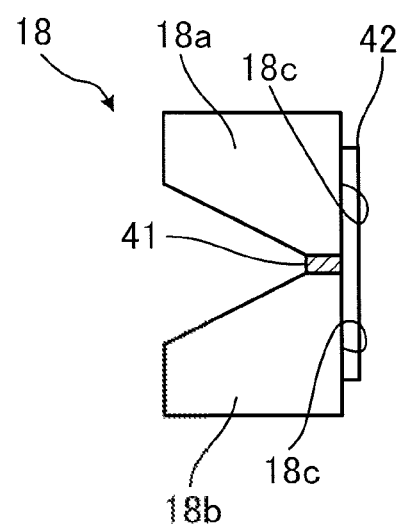
FIG. 3 is a side view showing a nozzle in expansion, the nozzle being included in the manufacturing device.
Figure 4:
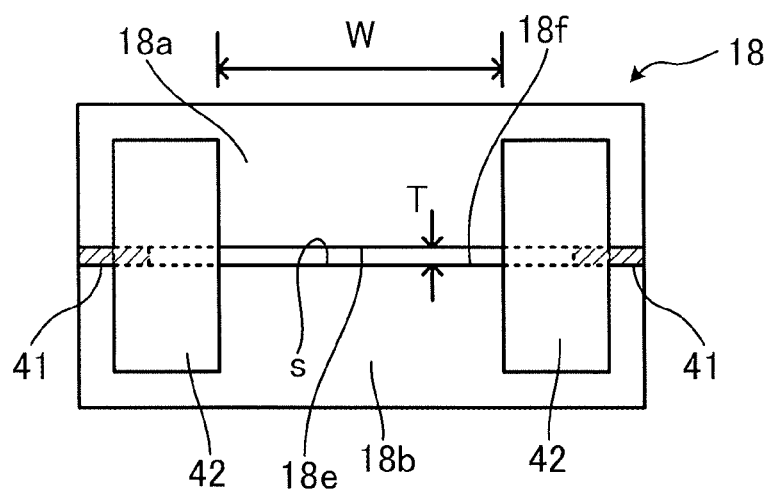
FIG. 4 is a front view of the nozzle included in the manufacturing device seen along a direction of an arrow IV in FIG. 1.

As shown in FIG. 3 that is an expanded view of the nozzle 18 and FIG. 4 that is a view of the nozzle 18 seen along a direction of an arrow IV in FIG. 1, the nozzle 18 includes a pair of upper and lower nozzle members 18a and 18b, a pair of right and left shims 41, and a pair of right and left guide plates 42.

The nozzle members 18a and 18b have respective opposite surfaces 18e and 18f which are vertically opposed to each other to define an upper end and a lower end of a slit s and respective tip-side surfaces 18c facing downstream in the transfer direction of the fiber bundle 8. The tip-side surface 18c is orthogonal to the transfer direction.

The pair of shims 41 is sandwiched between the opposite surfaces 18e and 18f of the nozzle members 18a and 18b, at respective positions spaced in a right and left direction. The thickness of the shim 41, therefore, determines a thickness size T of the rectangular slit s (a size of a shorter side of the opening at a front end of the nozzle 18) defined between the opposite surfaces 18e and 18f. The thickness size T corresponds to a thickness size of a fiber-reinforced thermoplastic resin tape manufactured by the passage of the fiber bundle 8 through the slit s. The pair of shims 41 are arranged at respective positions where the shims 41 make no contact with the fiber bundle 8 passing through the nozzle 18, specifically, at respective positions outwardly deviated from the fiber bundle 8 on both right and left sides thereof. The pair of guide plates 42 are attached to the opening part at the tip of the nozzle 18 through a screw or the like. The guide plates 42 are spaced at an interval W in the right and left direction, the interval W corresponding to the width size of the fiber-reinforced thermoplastic resin tape 9 to be manufactured. The pair of guide plates 42, thus, shapes the fiber bundle 8 passing through the opening of the nozzle 18 so as to bring the width of the fiber bundle 8 into coincidence with the width of the fiber-reinforced thermoplastic resin tape manufactured by the passage of the fiber bundle 8, the width corresponding to the interval W. In the present embodiment, the interval W between the pair of guide plates 42, that is, the width of a fiber-reinforced thermoplastic resin tape to be manufactured, is 15 mm; however, the interval is not limited thereto. Replacement of the shims 41 or position change of the pair of guide plates 42 enables the thickness or the width of a fiber-reinforced thermoplastic resin tape to be manufactured to be changed with ease.

Figure 5:
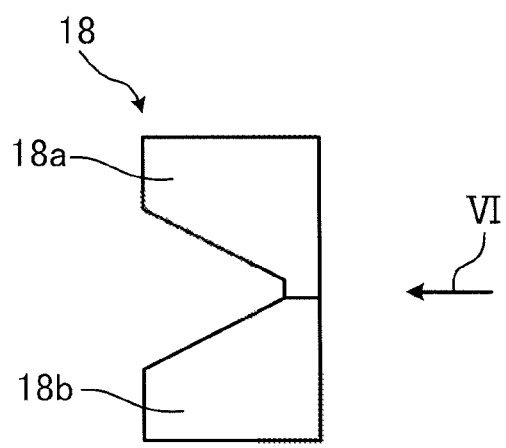
FIG. 5 is a side view showing a modification example of the nozzle in expansion.
Figure 6:
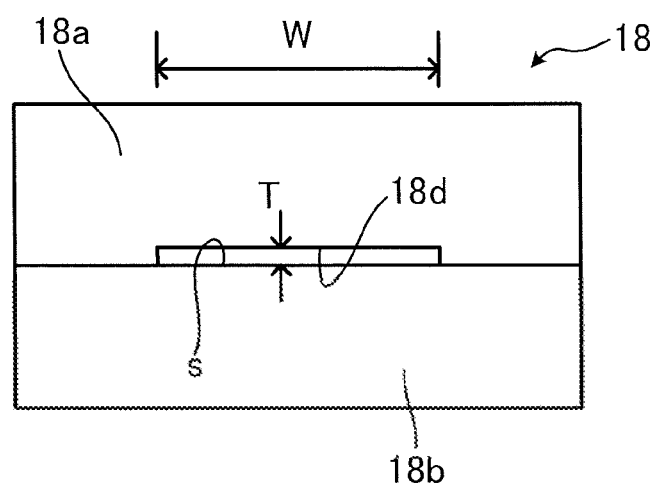
FIG. 6 is a front view of the nozzle shown in FIG. 5 seen along a direction of an arrow VI in FIG. 5.

FIG. 5 is a side view showing a modification example of the nozzle 18 in expansion, and FIG. 6 is a view of the nozzle 18 according to the modification example seen along a direction of an arrow VI. This nozzle 18 also includes a pair of nozzle members 18a and 18b, one of which, the nozzle member 18a, is formed with a groove 18d defining the slit s as shown in FIG. 6. The nozzle 18 requires neither the pair of shims 41 nor the pair of guide plates 42, thus having a small number of parts thereof. Besides, replacement of the nozzle member 18a with the groove 18d enables the width and the thickness of a fiber-reinforced thermoplastic resin tape to be manufactured to be changed with ease.

The impregnation roller 16 that is one of the plurality of impregnation rollers 16 and provided closest to the nozzle 18 (i.e., at the most downstream position) thereof is formed of a grooved roller 19 having a groove 19a. It is also permitted that each of impregnation rollers 16 that is a part of the plurality of impregnation rollers 16 and provided close to the nozzle 18 are grooved rollers 19. A guide bar, if disposed in place of the impregnation roller 16, may be provided with a groove.

Figure 7:
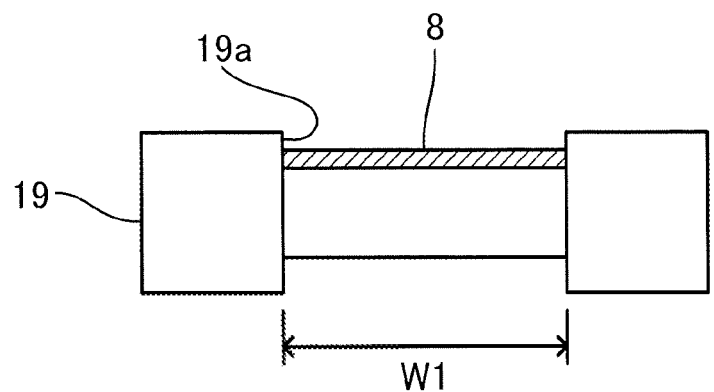
FIG. 7 is a front view of a grooved roller included in a resin impregnation device of the manufacturing device seen along the direction of the arrow IV.

As shown in FIG. 7 which is a view of the grooved roller 19 seen along the direction of the arrow IV in FIG. 1, the groove 19a is formed in an axially center region of the grooved roller 19, having a width W1 equivalent to the width of the fiber-reinforced thermoplastic resin tape 9 to be manufactured. The fiber bundle 8 is transferred so as to pass through the groove 19a, which prevents the width of the opened fiber bundle 8 from exceeding the width of the fiber-reinforced thermoplastic resin tape 9 to be manufactured. The width W1 of the groove 19a is basically equivalent to the interval W between the pair of guide plates 42 shown in FIG. 3.

For facilitating the change of the width of the fiber-reinforced thermoplastic resin tape to be manufactured, the impregnation roller 16 provided upstream of the grooved roller 19 may be a flat roller without a groove. Alternatively, all the impregnation rollers 16 may be grooved rollers 19.

Figure 8:
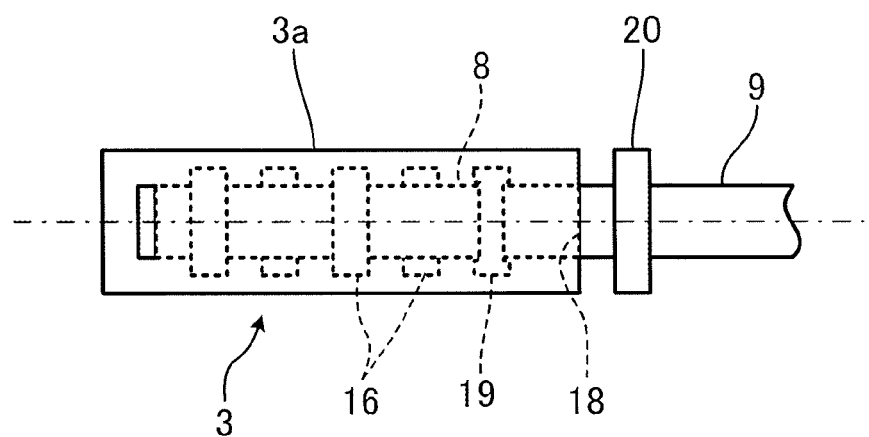
FIG. 8 is a plan view of the resin impregnation device.

As shown in FIG. 8 which is a plan view of the resin impregnation device 3 in FIG. 1, the center of the fiber bundle 8, the center of the nozzle 18, and the center of the grooved roller 19 are all coincident with each other when seen from above. This suppresses the deviation of the fiber density in the fiber-reinforced thermoplastic resin tape to be manufactured. FIG. 8 also shows a cooling roller 20 to be described later.

As shown in FIG. 1, the tape 9 shaped by the passage of the fiber bundle 8 through the nozzle 18 is transferred to the cooling roller portion 4 downstream of the nozzle 18. The cooling roller portion 4 includes the cooling roller 20 and a cooling roller 21 arranged in order in the transfer direction of the tape 9. Each of the cooling roller 20 and the cooling roller 21 has a circular cross-section and is dispose rotatably around the axis thereof. Each of the respective cooling roller 20 and cooling roller 21 is cooled by cooling water supplied through a rotary joint not shown, so as to keep respective temperatures of the cooling rollers 20 and 21 constant (e.g. approximately 20° C.).

The cooling roller 20 is supported by the below-described supporting device 51 rotatably so as to be movable between a cooling position downstream of the nozzle 18 and a retraction position away from the nozzle 18 beyond the cooling position. The cooling roller 20 has a cylindrical outer periphery surface, which makes contact with the tape 9, at the cooling position, while rotating in a direction to allow the transfer of the tape 9 to the downstream side, thereby cooling the tape 9. The position of the cooling roller 20 shown in FIG. 1 is the cooling position. The cooling roller 21 is disposed at a position downstream of the cooling roller 20 at the cooling position, so as to be unmovable, and cools the tape 9 while rotating in a direction allowing the transfer of the tape 9 to the downstream side. The cooling roller 20 and the cooling roller 21 come into surface contact with the tape 9 in a predetermined contact area.

Since the temperature of the tape 9 having passed through the nozzle 18 is equal to or higher than the melting point of thermoplastic resin, the thermoplastic resin is not solidified in the tape 9, which generates the tendency of causing roughness and fineness of the fiber in the width direction during the transfer. To suppress the roughness and fineness, the tape 9 immediately after passing through the nozzle 18 is first cooled rapidly by the cooling roller 20. The outer periphery surface of the cooling roller 20 comes into contact with a right surface (upper surface in the figure) of the tape 9 to cool the right surface. The outer periphery surface of the cooling roller 21 comes into contact with the back surface (lower surface in the figure) of the tape 9 to cool the back surface. These coolings promote solidification of thermoplastic resin included in the tape 9 before the occurrence of roughness and fineness in the fiber widthwise of the tape 9. The cooling roller 21 is disposed at a position to prevent the tape 9 from having "warp" due to uneven cooling in the thickness direction of the tape 9.

Figure 9:
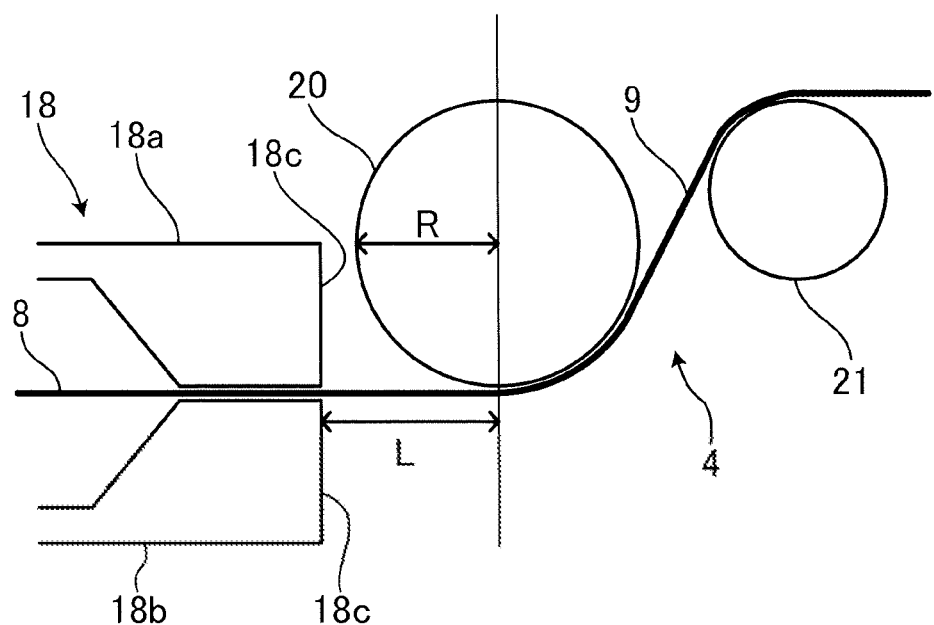
FIG. 9 is a side view showing, in expansion, the nozzle and a cooling roller portion arranged downstream of the nozzle which are included in the manufacturing device.

The distance L from the tip-side surface 18c as the outlet end of the nozzle 18 to the position where the outer periphery surface of the cooling roller 20 and the tape 9 come into contact with each other, as shown in FIG. 9 that is an expanded view of the nozzle 18 and the cooling roller portion 4, is determined on the basis of the size T of the shorter side of the opening at the tip of the nozzle 18 (that is, the width of the slit s shown in FIG. 4). Specifically, it is preferable to set the distance L such that the distance L satisfies the following Expression (A) when T<0.08 mm and satisfies the following Expression (B) when T≥0.08 mm.
(i) When T<0.08 mm, $$L[mm] \leq 1000 \times T[mm] - 35 \tag{A}$$

(ii) When T≥0.08 mm, $$L[mm] \leq 785.7 \times T[mm] - 17.9 \tag{B}$$

The tape 9 makes surface contact with the cooling roller 20 in a predetermined contact area in a region downstream of the position where the cooling roller 20 and the tape 9 come into contact with each other, the position being an end point of the distance L wherein the tip of the nozzle 18 is a start point, that is, the position being a position where the tape 9 starts making contact with the cooling roller 20.

As described above, the cooling roller 20 rapidly cools the tape immediately after passing through the nozzle 18 to promote solidification of thermoplastic resin of the tape 9 before occurrence of roughness and fineness in the fiber, thereby suppressing generation of the widthwise roughness and fineness of the tape 9.

Next will be described details of the supporting device 51.

In advance of the start of manufacturing of the fiber-reinforced thermoplastic resin tape, setting work is required to lay the fiber bundle 8 not having yet impregnated with melt resin over the above-described plurality of rollers. Besides, following the finish of the manufacturing, a work of attaching and detaching the nozzle 18 to and from the container 3a is required in order for the maintenance (mainly cleaning) of the nozzle 18. However, the cooling roller 20, which is disposed near the nozzle 18 so that the distance L satisfies the Expression (A) or Expression (B) (e.g., so that the distance L becomes 15 mm in the case where the tape 9 has a thickness of 0.05 mm,), obstructs the setting work and the attaching and detaching work to hinder the maintenance work of the nozzle 18 or the preparation work before the start of operation, during the time of stop of the manufacturing. The time of stop of the manufacturing widely includes a time zone where no manufacturing is conducted. For example, also included are a time zone where maintenance of the nozzle 18 is conducted immediately after the finish of manufacturing and a time zone where the fiber bundle 8 is laid over the respective rollers immediately before the start of manufacturing.

The supporting device 51 allows the cooling roller 20 to be moved between the cooling position and the retraction position away from the nozzle 18 beyond the cooling position, while the supporting device 51 supports the cooling roller 20.

Figure 10:
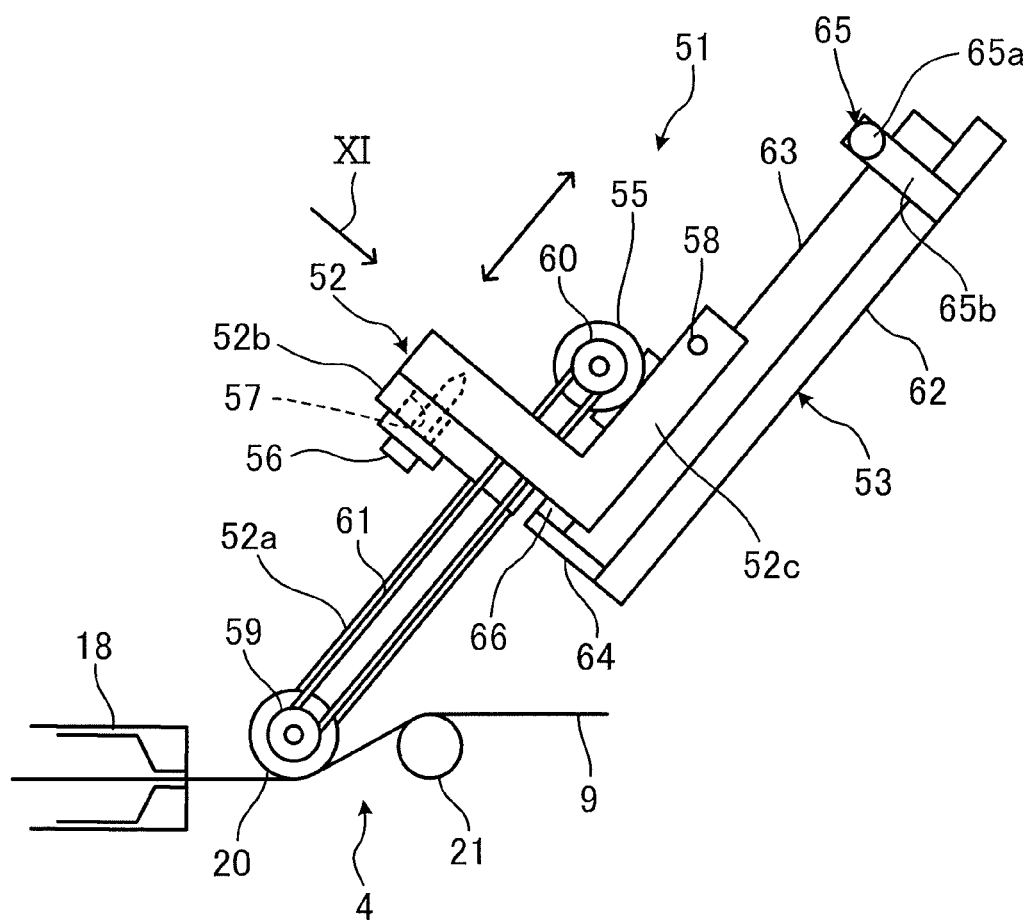
FIG. 10 is a side view showing a supporting device included in the manufacturing device.
Figure 11:
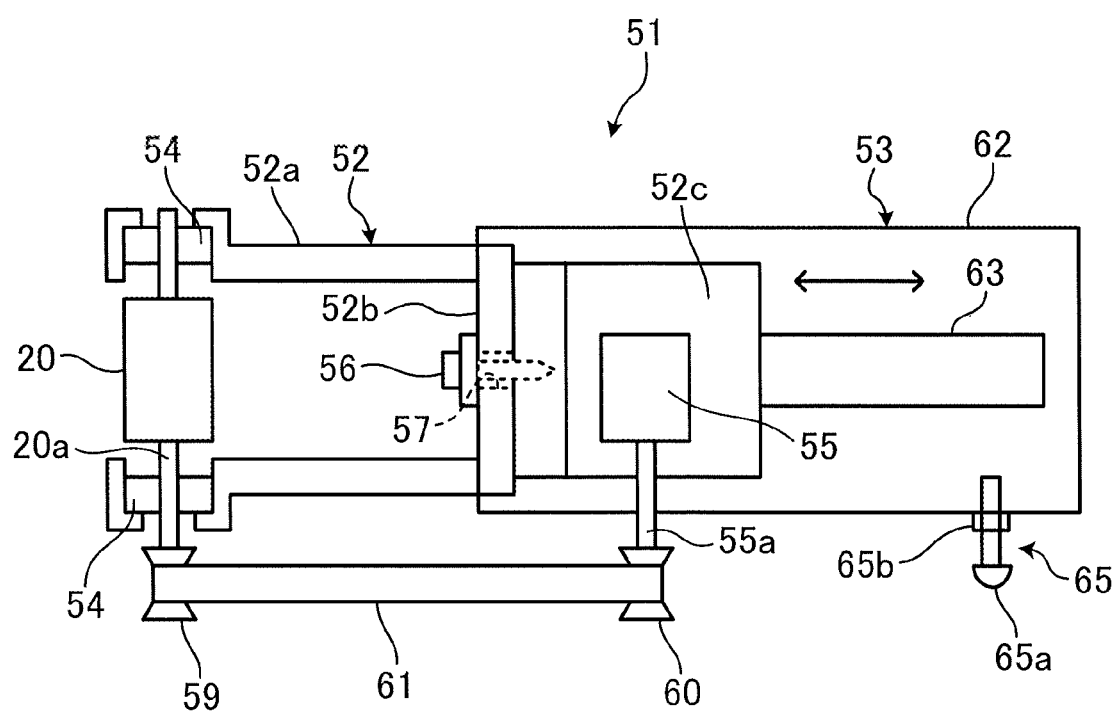
FIG. 11 is a view of the supporting device in FIG. 10 seen along a direction of an arrow XI.

As shown in FIG. 10 and FIG. 11, the supporting device 51 has a rotatable support portion 52 which rotatably supports the cooling roller 20, a slide base 53 which supports the rotatable support portion 52 slidably, and a motor 55.

The rotatable support portion 52 includes a pair of arm portions 52a, a coupling portion 52b, a placement portion 52c, and a pair of bearings 54.

The pair of arm portions 52a extend in parallel to each other along a specific longitudinal direction. Each of the arm portions 52a has longitudinally opposite end portions, namely, a proximal end portion and a distal end portion, the distal end portion holding each of the pair of bearings 54. As shown in FIG. 11, the cooling roller 20 has a rotary shaft 20a as a roller center shaft extending along an axis of the cooling roller 20, and the bearing 54 rotatably supports the rotary shaft 20a. In summary, respective distal end portions of the pair of arm portions 52a rotatably support the cooling roller 20 via the pair of bearings 54, respectively.

Respective proximal end portions of the pair of arm portions 52a are coupled to the placement portion 52c through the coupling portion 52b. The coupling portion 52h and the placement portion 52c are detachably coupled to each other through a fastening member 56 such as a bolt.

The fastening member 56 passes through a long hole 57 provided in the coupling portion 52b, fixed to the placement portion 52c. The long hole 57 defines an opening having a shape extending orthogonally to both the longitudinal direction of the pair of arm portions 52a and the axis direction of the cooling roller 20.

The placement portion 52c is a motor support portion which supports the motor 55, allowing the motor 55 to be placed on the placement portion 52c. As shown in FIG. 11, the motor 55 has a rotary output shaft 55a, being placed on the placement portion 52c in such an attitude that the rotary output shaft 55a and the rotary shaft 20a of the cooling roller 20 are parallel to each other, specifically, in such an attitude that the rotary output shaft 55a and the rotary shaft 20a are orthogonal to the longitudinal direction of the pair of arm portions 52a. The placement portion 52c has a side portion, which is provided with a hole 58 opened laterally.

The supporting device 51 further includes a drive transmission mechanism which transmits a rotational force outputted from the motor 55 to the cooling roller 20 to rotate the cooling roller 20. The drive transmission mechanism includes a pulley 59 provided in one end portion of the rotary shaft 20a of the cooling roller 20, the one end portion being on the same side as that of the rotary output shaft 55a of the motor 55, a pulley 60 provided in an end portion of the rotary output shaft 55a of the motor 55, and a belt 61 looped between the pulley 59 and the pulley 60.

The slide base 53 includes a base portion 62, a slide guide 63, a stopper 64, and a fixing mechanism 65. The base portion 62 is provided fixedly at an appropriate place in an inclined attitude as shown in FIG. 10. The slide guide 63 is fixed on the base portion 62 in such an attitude that the slide guide 63 extends in a specific sliding direction (in this embodiment, a direction parallel to the longitudinal direction of the pair of arm portions 52a) inclined along the base portion 62, and the placement portion 52c of the rotatable support portion 52 is engaged with the slide guide 63 slidably in the longitudinal direction of the slide guide 63, that is, along the sliding direction. The placement portion 52c is, thus, guided by the slide guide 63 along the longitudinal direction thereof to be slid on the base portion 62 in the sliding direction. This causes the rotatable support portion 52 including the placement portion 52c and the cooling roller 20 supported by the rotatable support portion 52 to be moved in the sliding direction. The stopper 64 is fixed to a lower end portion of the base portion 62, that is, the end portion closest to the nozzle 18, to make contact with the placement portion 52c directly or indirectly via a spacer 64 shown in FIG. 10, thereby defining a front end position of a slide range of the placement portion 52c, that is, the cooling position. The fixing mechanism 65 fixes the placement portion 52c of the rotatable support portion 52 at a rear end position of the slide range, that is, at the retraction position away from the cooling position oppositely to the nozzle 18. Specifically, the fixing mechanism 65 includes a plunger 65a and a plunger support portion 65b. The plunger 65a has a shape capable of being inserted into and removed from the hole 58 of the placement portion 52c in an insertion-and-removal direction orthogonal to the sliding direction. The plunger support portion 65b is fixed to the base portion 62 to support the plunger 65a movably in the insertion-and-removal direction.

Sliding of the rotatable support portion 52 relative to the slide base 53 enables the cooling roller 20 supported by the rotatable support portion 52 to be moved between the cooling position and the retraction position away from the nozzle 18 beyond the cooling position in the sliding direction. At the cooling position, the outer periphery surface of the cooling roller 20 makes contact with the tape 9 having passed through the nozzle 18 to cool the tape 9. Arrival of the cooling roller 20 at the cooling position brings the placement portion 52c or a spacer 66 interposed between the placement portion 52c and the stopper 64 into abutment against the stopper 64 as shown in FIG. 10. Preparing a plurality of different spacers 66 and selecting the spacer 66 having an appropriate thickness from the plurality of spacers 66 or adjusting the thickness of the spacer 66 makes it possible to perform fine adjustment of the cooling position of the cooling roller 20 in the sliding direction. In addition, varying relative position of the coupling portion 52b to the placement portion 52c within the range of the opening of the long hole 57 provided in the coupling portion 52b makes it possible to perform fine adjustment of the cooling position of the cooling roller 20 also in the direction orthogonal to the sliding direction.

Arrival of the cooling roller 20 supported by the rotatable support portion 52 at the retraction position allows the plunger 65a supported by the plunger support portion 65b in the fixing mechanism 65 to be inserted into the hole 58 in the side portion of the placement portion 52c of the rotatable support portion 52. The insertion enables the fixing mechanism 65 to fix the cooling roller 20 to the retraction position.

The sliding direction, though permitted to be a direction inclined to the axis direction of the cooling roller 20, is preferably a direction orthogonal to the axis direction. This allows the width direction of the tape 9 to be parallel to the rotary shaft of the cooling roller 20. Inclination of the sliding direction to the axis direction generates the possibility that the cooling roller 20 being moved to the cooling position comes into contact with only a part of a widthwise region of the tape 9 in advance of contact with the other part of the region to cause uneven cooling widthwise of the tape 9 and increase in a tension in a part of fiber; this may cause breaking of the tape 9 or difficulty in continuing manufacture. In contrast, orthogonality of the sliding direction to the axis direction of the cooling roller 20 enables a longitudinal (axial) contact region of the cooling roller 20 moved to the cooling position to come into simultaneous contact with the widthwise entire region of the tape 9.

Inclination of the sliding direction to the axis direction also generates the possibility that the cooling roller 20, when going away from the cooling position toward the retraction position, leaves only a part of a widthwise region of the tape 9 in advance of leaving the other region to thereby cause widthwise uneven cooling of the tape 9 and increase in a tension of a part of fiber; this may cause breaking of the tape 9 or necessity of resetting the fiber bundle 8 to the device for subsequent manufacture. In contrast, orthogonality of the sliding direction to the axis direction of the cooling roller 20 enables the longitudinal (axial) contact region of the cooling roller 20 to leave the widthwise entire region of the tape 9 simultaneously when the cooling roller 20 is moved from the cooling position to the retraction position along the sliding direction.

It is preferable that each of the rotatable support portion 52 and the cooling roller 20 is kept in such an attitude that the width direction of the tape 9 and the axis direction of the cooling roller 20 are parallel to each other even during the sliding of the rotatable support portion 52 guided by the slide guide 63.

As described in the foregoing, this device enables the cooling roller 20 to be fixed at the retraction position by pre-manufacture operation of manually moving the cooling roller 20 from the cooling position to the retraction position along the sliding direction and inserting the plunger 65a into the hole 58 in the placement portion 52c of the rotatable support portion 52 which supports the cooling roller 20. Upon start of manufacturing, it is possible to position the cooling roller 20 at a position suitable for cooling of the tape 9, namely, the cooling position close to the nozzle 18, by removing the plunger 65a from the hole 58 and manually sliding the rotatable support portion 52 toward the cooling position to bring the placement portion 52c or the spacer 66 as a position adjustment member provided in the placement portion 52c into abutment against the stopper 64. After the finish of the manufacture, it is possible to fix the cooling roller 20 at the retraction position by manually sliding the supporting device 52 to move the cooling roller 20 to the retraction position again and inserting the plunger 65a into the hole 58.

Thus, it is possible to move the cooling roller 20 disposed at the cooling position for cooling the tape 9 having passed through the nozzle 18 in a direction to bring the cooling roller 20 away from the nozzle 18 beyond the cooling position. This makes it possible to move the cooling roller 20 to the cooling position close to the nozzle 18 at the time of manufacture to thereby conduct effective cooling of the tape 9, and makes it possible to move the cooling roller 20 away from the nozzle 18 to the retraction position when no manufacture is performed to thereby secure a work space for attaching and detaching work of the nozzle 18 to conduct suitable maintenance work of the nozzle 18. Besides, retraction of the cooling roller 20 from the nozzle 18 makes it possible to secure a work space for drawing out the fiber bundle 8 from the nozzle 18, thereby allowing the work of laying the fiber bundle 8 that has not yet been impregnated with melt resin on the device to be suitably conducted. In summary, the maintenance work of the nozzle 18 and the preparation work before the start of manufacturing are allowed to be suitably conducted.

Specifically, the sliding of the rotatable support portion 52 in the sliding direction relative to the slide base 53 enables the cooling roller 20 to be moved between the cooling position and the retraction position while the cooling roller 20 is being supported by the rotatable support portion 52. This makes it possible to move the cooling roller 20 to the retraction position sufficiently away from the nozzle 18 through sliding of the rotatable support portion 52 in the sliding direction, during the absence of manufacture, to thereby suitably conduct the maintenance work of the nozzle 18 and the preparation work before the start of manufacturing, and makes it possible to move the cooling roller 20 to the cooling position sufficiently close to the nozzle 18, during manufacture, to suitably manufacture fiber-reinforced thermoplastic resin tape having no roughness and fineness of fiber in the width direction.

The orthogonality of the sliding direction to the axis direction of the cooling roller 20 allows the width direction of the tape 9 and the rotary shaft of the cooling roller 20 to be parallel to each other, thereby enabling the longitudinal (axial) contact region of the cooling roller 20 to come into simultaneous contact with the widthwise entire region of the tape 9 when the cooling roller 20 arrives at the cooling position and enabling the longitudinal (axial) contact region of the cooling roller 20 to simultaneously leave the widthwise entire region of the tape 9 when the cooling roller 20 is moved away from the cooling position toward the retraction position. These suppress temporary uneven cooling widthwise of the tape 9 and a remarkable increase in a tension in a part of fiber to thereby allow the tape 9 to be prevented from breaking.

While the supporting device 51 includes the motor 55 to actively rotate the cooling roller 20, the supporting device according to the present invention may perform only supporting the cooling roller 20 so that the cooling roller 20 is passively rotated by contact with the tape 9 to allow the tape 9 to be transferred. This case does not require the motor 55.

Although the slide guide 63 is a so-called "linear guide", the guide structure through which the slide base according to the present invention allows the rotatable support portion to slide is not limited to a linear guide. The guide structure may be, for example, based on a combination of a bush having an axis direction parallel to the sliding direction and a guided shaft to be inserted into the bush, or based on a combination of a rail and a roller that rolls thereon.

Besides, the position adjustment member for fine adjustment of the cooling position of the cooling roller 20 is not limited to the spacer 66 interposed between the stopper 64 and the placement portion 52c. The position adjustment member may be a push bolt attached to the rotatable support portion displacably in the sliding direction or a plunger to be inserted into the placement portion 52c.

Position adjustment of the cooling roller 20 in the direction orthogonal to the sliding direction is also not limited to one based on the shape of the opening of the long hole 57 provided in the coupling portion 52b. The position adjustment can be also conducted, for example, by use of a mechanism allowing the coupling portion 52b to make relative displacement to the placement portion 52c in the direction orthogonal to the sliding direction.

The relative movement of the supporting device 52 to the slide base 53 may be done not manually but by driving by an actuator. Specifically, the supporting device according to the present invention may include a drive mechanism for moving the cooling roller, for example, a linear motion mechanism including a ball thread and a motor to rotate the same, or a fluid actuator such as an air cylinder or a hydraulic cylinder, or a linear motion mechanism including a gear mechanism constituted by a rack and a pinion and an actuator to actuator either one of them.

Motion of the rotatable support portion 52 is not limited to a linearly reciprocal motion along the slide guide 63. For example, the rotatable support portion 52a may be attached with a hinge to allow the rotatable support portion 52 to make rotational movement which moves the cooling roller 20 between the cooling position and the retraction position.

The rotatable support portion 52 may be detachable from the slide base 53.

In the fiber-reinforced thermoplastic resin tape manufacturing device 100 as shown in FIG. 1, the tape 9 cooled as described above in the cooling roller portion 4 is transferred to the cooling portion 5.

The cooling portion 5 cools the tape 9 with water. The cooling portion 5 according to the present embodiment is a water-cooled pool. The cooling portion 5 may cool the tape 9 by air. Alternatively, the cooling portion 5 can be omitted if the cooling by the cooling roller portion 4 is sufficient.

The tape 9 cooled in the cooling portion 5 is transferred to the drawing machine 6. The drawing machine 6 draws the cooled tape 9. The winding machine 7 winds the tape 9 drawn by the drawing machine 6. To simplify the configuration for causing the tape 9 and further the fiber bundle 8 upstream thereof to run at a predetermined speed in the transfer direction, it is also possible to additionally give the winding machine 7 the function of the drawing machine 6, that is, the function of drawing the tape 9 and causing the tape 9 to run at a predetermined speed.

As described in the foregoing, according to the method and the device according to the present embodiment, the cooling roller 20 disposed at the cooling position for cooling the tape 9 having passed through the nozzle 18 is able to move in a direction to bring the cooling roller 20 away from the nozzle 18. Specifically, the sliding of the supporting device 52 relative to the slide base 53 allows the cooling roller 20 to be moved between the cooling position and the retraction position.

Thus locating the cooling roller 20 away from the nozzle 18 allows a work space to be secured for attaching and detaching the nozzle 18 to and from the device, which allows the maintenance of the nozzle 18 to be suitably conducted. In addition, locating the cooling roller 20 away from the nozzle 18 allows a work space to be secured for drawing out the fiber bundle 8 from the nozzle 18, which enables a work of laying the fiber bundle 8 on the device to be suitably conducted, the fiber bundle 8 having not yet been impregnated with melt resin. This allows maintenance work of the nozzle 18 and preparation work before the start of manufacturing to be suitably conducted. At the following time of manufacture, moving the cooling roller 20 to the cooling position allows the cooling roller 20 to be sufficiently close to the nozzle 18, thereby making it possible to suitably manufacture a fiber-reinforced thermoplastic resin tape having no roughness and fineness of fiber in the width direction.

Besides, the slide base 53 allows the rotatable support portion 52 to slide in the direction orthogonal to the axis direction of the cooling roller 20, thereby enabling the cooling roller 20 to be moved in the direction orthogonal to the axis direction of the cooling roller 20. This allows the width direction of the tape 9 and the rotary shaft of the cooling roller 20 to be parallel to each other. The cooling roller 20 is thus allowed to come into simultaneous contact with the widthwise entire region of the tape 9 upon arrival at the cooling position and allowed to leave the widthwise entire region of the tape 9 simultaneously when moved away from the cooling position to the retraction position. These suppress temporary uneven cooling in the width direction of the tape 9 and a remarkable increase in a tension in a part of fiber, thereby allowing the tape 9 to be prevented from breaking.

The above description about the embodiment of the present invention is just to illustrate a specific example, not suggesting any particular limitation of the present invention; a specific configuration is permitted to be appropriately designed to be changed. Besides, the functions and the effects recited in the embodiment of the present invention are only illustrative of most preferable functions and effects derived from the present invention, and the functions and effects derived from the present invention are not to be limited to those recited in the embodiment of the present invention.

For example, while the above-described embodiment of the present invention shows the opening of the fiber bundle 8 by the resin impregnation device 3, the present invention is not limited thereto. For example, it is also possible to provide an opening machine upstream of the resin impregnation device 3, more specifically, between the fiber preheater 2 and the resin impregnation device 3, the opening machine configured to open the fiber bundle 8. Alternatively, it is also possible to prepare the fiber bundle 8 having been already opened and wound around the fiber bobbin 11, the fiber bundle 8 being able to be fed from the feeder 1.

As described in the foregoing, a device and a method are provided for manufacturing a fiber-reinforced thermoplastic resin tape, the device and the method being capable of suitably cooling a fiber bundle without hindering maintenance work and preparation work before the start of manufacturing.

Provided is a device for manufacturing a fiber-reinforced thermoplastic resin tape, the device including: a resin impregnation device which has a container that contains melted thermoplastic resin and passes a fiber bundle through the thermoplastic resin contained in the container to impregnate the fiber bundle with the thermoplastic resin; a nozzle which is provided in an outlet portion of the container of the resin impregnation device and allows the fiber bundle impregnated with thermoplastic resin to pass through the nozzle, while forming the fiber bundle into a tape shape; a cooling roller which has an outer periphery surface capable of making contact with the fiber bundle having passed through the nozzle, the cooling roller being capable of rotating around a roller center axis so as to allow the fiber bundle to be moved downstream while the outer periphery surface makes contact with the fiber bundle, the cooling roller adapted to cool the fiber bundle through the contact of the outer periphery surface with the fiber bundle; and a supporting device which rotatably supports the cooling roller so as to allow the cooling roller to move between a cooling position at which the outer periphery surface of the cooling roller is capable of contact with the fiber bundle having passed through the nozzle and a retraction position away from the nozzle beyond the cooling position.

This device allows the cooling roller to be moved between the cooling position close to the nozzle and the retraction position away from the nozzle beyond the cooling position while the supporting device rotatably supports the cooling roller. Thus, it is possible to locate the cooling roller at the cooling position when manufacture is performed to thereby cool a fiber bundle discharged from the nozzle efficiently and to retract the cooling roller to the retraction position when no manufacture is performed to thereby prevent the cooling roller from obstructing nozzle maintenance work or preparation work before the start of manufacturing to facilitate the works.

It is preferable that supporting device includes, for example, a rotatable support portion which supports the cooling roller rotatably around the roller center axis and a slide base which supports the rotatable support portion slidably in a sliding direction, in which direction the cooling roller is moved between the cooling position and the retraction position through sliding of the rotatable support portion along the sliding direction. While rotatably supporting the cooling roller by the rotatable support portion, the supporting device enables the cooling roller supported by the rotatable support portion to be easily moved between the cooling position and the retraction position by utilization of the sliding movement of the rotatable support portion relative to the slide base.

The sliding direction is preferably a direction orthogonal to the roller center axis of the cooling roller. This allows a width direction of a fiber bundle coming out from the nozzle and the roller center axis of the cooling roller to be parallel to each other, thereby enabling the cooling roller to come into simultaneous contact with the widthwise entire region of the fiber bundle at the arrival of the cooling roller at the cooling position and enabling the cooling roller to simultaneously leave the widthwise entire region of the fiber bundle when the cooling roller is moved away from the cooling position toward the retraction position. These suppress temporary uneven cooling in the width direction of the fiber bundle and a remarkable increase in a tension in a part of fiber, thereby allowing the fiber bundle to be prevented from breaking.

Preferably, the supporting device further includes a motor which drives the cooling roller rotationally in a direction to transfer the fiber bundle making contact with the outer periphery surface of the cooling roller to a downstream side, the rotatable support portion supporting the motor. The supporting device can actively drive the cooling roller rotationally through the motor. Besides, the motor supported by the rotatable support portion is able to keep its connection with the cooling roller irrespectively of relative movement of the rotatable support portion to the slide base.

The rotatable support portion preferably includes: an arm portion having a distal end portion supporting the cooling roller rotatably and a proximal end portion opposite to the distal end portion; and a motor support portion which supports the proximal end portion of the arm portion and the motor, the motor support portion being engaged with the slide base so as to be slidable in the sliding direction relatively to the slide base.

Also provided is a method for manufacturing a fiber-reinforced thermoplastic resin tape, the method including: a resin impregnation step of impregnating a fiber bundle with melted thermoplastic resin; a nozzle passing step of passing the fiber bundle, which has been impregnated in the resin impregnation step, through an opening of a nozzle; a cooling step of cooling the fiber bundle while transferring the fiber bundle downstream by bringing the fiber bundle having passed through the nozzle passing step into contact with an outer periphery surface of a cooling roller disposed at a cooling position downstream of the nozzle while involving rotation of the cooling roller around a roller center axis of the cooling roller; and a moving step of moving the cooling roller from the cooling position to a retraction position away from the nozzle beyond the cooling position when no manufacture of the fiber-reinforced thermoplastic resin tape is performed through the resin impregnation step, the nozzle passing step, and the cooling step.

Preferably, the method further includes a step of preparing a supporting device which supports the cooling roller rotatably around the roller center axis and movably between the cooling position and the retraction position, the moving step including moving the cooling roller between the cooling position and the retraction position while the cooling roller is supported by the supporting device. The method makes it possible to move the cooling roller between the cooling position and the retraction position while supporting the cooling roller stably by the supporting device.

In the moving step, the cooling roller is preferably moved in a direction orthogonal to the axis direction of the cooling roller.

The invention claimed is:

1. A device for manufacturing a fiber-reinforced thermoplastic resin tape, the device comprising:
    a resin impregnation device, which comprises a container which comprises a melted thermoplastic resin and passes a fiber bundle through the thermoplastic resin in the container to impregnate the fiber bundle with the thermoplastic resin;
    a nozzle which is provided in an outlet portion of the container of the resin impregnation device and allows the fiber bundle impregnated with the thermoplastic resin to pass through the nozzle, while forming the fiber bundle into a tape shape;
    a cooling roller portion disposed immediately downstream of the nozzle, the cooling roller portion comprising:
    a first cooling roller which has a first outer periphery surface capable of contact with an upper surface of the fiber bundle having passed through the nozzle, wherein the first cooling roller is capable of rotating around a first roller center axis so as to allow the fiber bundle to move to a downstream side away from the nozzle while the first outer periphery surface makes contact with the upper surface of the fiber bundle and cooling the fiber bundle through the contact between the first outer periphery surface and the upper surface of the fiber bundle, wherein the fiber bundle passes underneath the first cooling roller; and
    a second cooling roller which is disposed downstream of the first cooling roller and is further away from the nozzle than the first cooling roller and has a second outer periphery surface capable of contact with a lower surface of the fiber bundle, wherein the lower surface is opposite to the upper surface, wherein the second cooling roller is capable of rotating around a second roller center axis so as to allow the fiber bundle to move to a downstream side away from the nozzle while the second outer periphery surface makes contact with the lower surface of the fiber bundle and cooling the fiber bundle through the contact between the second outer periphery surface and the lower surface of the fiber bundle, wherein the fiber bundle passes over the second cooling roller; and
    a supporting device which supports the first cooling roller rotatably so as to allow the first cooling roller to move between a cooling position at which the first outer periphery surface of the first cooling roller comes into contact with the upper surface of the fiber bundle having passed through the nozzle and a retraction position which is upwardly away from the nozzle beyond the cooling position, wherein the first cooling roller at the retraction position is not in contact with the fiber bundle, and wherein the retraction position of the first cooling roller is on an upward and inclined direction with respect to a longitudinal direction of the resin impregnation device and away from the nozzle.

2. The device according to claim 1,
    wherein the supporting device comprises:
    a rotatable support portion which supports the first cooling roller rotatably around the first roller center axis, and
    a slide base which supports the rotatable support portion slidably in a sliding direction, in which direction the first cooling roller is moved between the cooling position and the retraction position by sliding of the rotatable support portion along the sliding direction.

3. The device according to claim 2, wherein the sliding direction is a direction orthogonal to the first roller center axis of the first cooling roller.

4. The device according to claim 2, wherein the supporting device further comprises:
    a motor which drives the first cooling roller rotationally in a direction to transfer the fiber bundle making contact with the first outer periphery surface of the first cooling roller to a downstream side, wherein the rotatable support portion supports the motor.

5. The device according to claim 4, wherein the rotatable support portion comprises:

an arm portion having a distal end portion which rotatably supports the first cooling roller and a proximal end portion opposite to the distal end portion, and a motor support portion which supports the proximal end portion of the arm portion and the motor, wherein the motor support portion is engaged with the slide base so as to be slidable in the sliding direction relatively to the slide base.

6. A method for manufacturing a fiber-reinforced thermoplastic resin tape, the method comprising:

impregnating a fiber bundle with a melted thermoplastic resin;

passing the impregnated fiber through a nozzle having an opening as a rectangular slit;

cooling the fiber bundle while transferring the fiber bundle downstream away from the nozzle by bringing an upper surface of the fiber bundle having passed through the nozzle into contact with a first outer periphery surface of a first cooling roller of a cooling roller portion disposed immediately downstream of the nozzle while involving rotation of the first cooling roller around a first roller center axis of the first cooling roller, and bringing a lower surface of the fiber bundle into contact with a second outer periphery surface of a second cooling roller of the cooling roller portion while involving rotation of the second cooling roller around a second roller center axis of the second cooling roller, wherein the second cooling roller is disposed downstream of the first cooling roller and is further away from the nozzle than the first cooling roller, and the lower surface is opposite to the upper surface, wherein the fiber bundle passes underneath the first cooling roller and over the second cooling roller; and moving the first cooling roller from a cooling position where the first outer periphery surface of the first cooling roller comes into contact with the upper surface of the fiber bundle to a retraction position where the first cooling roller is upwardly away from the nozzle beyond the cooling position when no manufacture of the fiber-reinforced thermoplastic resin tape is being performed, wherein the first cooling roller at the retraction position is not in contact with the fiber bundle, and wherein the retraction position of the first cooling roller is on an upward and inclined direction with respect to a longitudinal direction of the resin impregnation device and away from the nozzle.

7. The method according to claim 6, wherein the moving comprises moving the first cooling roller from the cooling position to the retraction position and returning the first cooling roller from the retraction position to the cooling position before manufacturing a subsequent fiber-reinforced thermoplastic resin tape.

8. The method according to claim 7, further comprising:

preparing a supporting device which supports the first cooling roller rotatably around the first roller center axis and movably between the cooling position and the retraction position, wherein the moving comprises moving the first cooling roller between the cooling position and the retraction position while the first cooling roller is supported by the supporting device.

9. The method according to claim 6, wherein the first cooling roller is moved in a direction orthogonal to the axis direction of the first cooling roller in the moving.

* * * * *